Patented Aug. 31, 1954

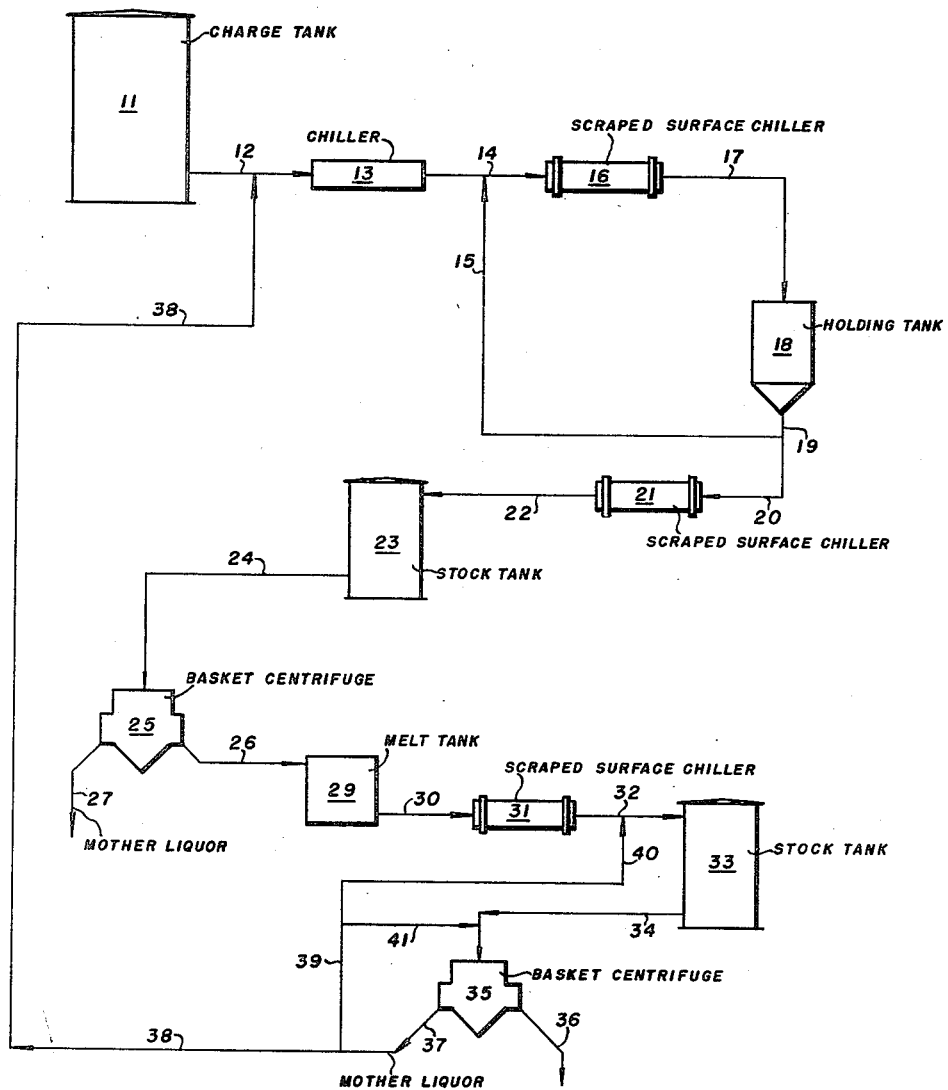

2,688,045

UNITED STATES PATENT OFFICE 2,688,045

PRODUCTION OF PARAXYLENE CONCENTRATE

John M. Powers and Raymond A. Speed, Baytown, Tex., assignors, by mesne assignments, to Standard Oil Development Company, Elizabeth, N. J., a corporation of Delaware Application May 23, 1952, Serial No. 289,504

6 Claims. (Cl. 260—674)

The present application is directed to a process for recovering high purity paraxylene from a mixture containing paraxylene and at least one other isomeric xylene.

Processes are known for obtaining a mixture of xylenes. As a specific example, in the petroleum refining art it is possible by subjecting fractions to hydroforming and then to distillation to obtain a mixture of isomeric xylenes in which the paraxylene is present in an amount of about 16% by volume. The present invention is directed to a simple, efficient crystallization procedure for recovering paraxylene in substantially pure form from a feed stock containing a low concentration of paraxylene, for example 12 to 25% by volume.

Briefly, in the process of the present invention, a feed stock containing paraxylene in an amount within the range of about 12 to 25% by volume contaminated by at least one other isomeric xylene is subjected to a crystallization procedure and the resultant crystals of high paraxylene content are then separated as desired product. The chilling procedure is carried out so as to produce crystals of relatively large size which drain readily in the separation step.

In the procedure involved the feed stock is preliminarily chilled to a temperature close to but above its crystallization point and the chilled feed then admixed with a chilled slurry of the same composition to form a mixture at a temperature approximately 10° below the crystallization point of the feed stock. This mixture then has its temperature reduced approximately 10° further by passing it through a scraped surface heat exchanger and is then held in a holding tank at this temperature for an average time of about two hours. From the holding tank a portion of the slurry is withdrawn and used for admixing with the chilled feed stock and another portion is passed through a second scraped surface heat exchanger where its temperature is reduced 10 or 15° F. further to a temperature just above the eutectic of paraxylene with the next most easily precipitated component and then sent to a separating zone where high paraxylene content crystals are separated from a mother liquor. In this way a paraxylene concentrate having from 85% to 90% or higher paraxylene may be obtained from a feed stock of low paraxylene content.

If desired, the crystals of paraxylene content obtained from the separation stage may be subjected to a further and similar purification step to secure a final product having as high as 98% paraxylene content.

The invention will be further described by reference to the drawing in which the sole figure is in the form of a diagrammatic flow sheet illustrating a preferred mode for carrying out the present invention.

Turning now specifically to the drawing, 11 designates a charge tank containing a liquid mixture of hydrocarbons which may contain ethylbenzene, paraxylene, metaxylene, and orthoxylene. An analysis of a typical feed stock for the process of the present invention is given in the following table:

Table

| Component | Volume Percent by Infrared Analysis |
|---|---|
| Toluene | 2.0 |
| Ethylbenzene | 19.2 |
| Paraxylene | 15.7 |
| Metaxylene | 42.2 |
| Orthoxylene | 20.9 |

The feed stock from tank 11 is withdrawn through line 12 and passed into chiller 13 where it is chilled to a temperature close to but above its normal crystal point. The chilled feed stock is removed from chiller 13 through line 14 and admixed with chilled slurry of the same composition introduced by line 15 to form a chilled mixture having a temperature approximately 10° F. below the normal crystal temperature of the feed stock. The chilled mixture is then passed into a scraped surface heat exchanger 16 where its temperature is lowered approximately an additional 10° F. From the scraped surface chiller the slurry mixture is passed by line 17 to a holding tank 18 where it is held at a low temperature approximating the temperature of outlet of chiller 16 for an average time of about two hours. Chilled slurry is withdrawn from holding tank 18 through line 19 and the stream split with a major portion passing to branch line 15 for admixture with chilled feed in line 14 and the remainder passed through a branch line 20 to a second scraped surface heat exchanger 21 where its temperature is further reduced an additional amount, the reduction ranging from 10° to 20° F. From second scraped surface heat exchanger 21 the slurry passes by line 22 to stock tank 23 and then passes by line 24 to a separating step here shown as basket centrifuge 25 where a crystal cake of high paraxylene content is separated and withdrawn through line 26 and a mother liquor is withdrawn through line 27.

By way of example, the feed stock may be chilled to a temperature within the range of −35 to −55° F. in chiller 13. The chilled feed stock free from paraxylene crystals withdrawn from chiller 13 may be admixed with slurry from line 15 and having a temperature in the range of −75° to −85° F. to form a mixture having a temperature of −65 to −75° F. which is passed to the first scraped surface heat exchanger 16. In scraped surface heat exchanger 16 the mixture may be chilled to a temperature in the range of −75 to −85° F. and then passed to holding tank 18 which is maintained at substantially the same temperature. The recycle ratio of slurry in line 15 is about 20 volumes of slurry to one volume of fresh feed. The slurry passed from holding tank 18 to scraped surface chiller 21 may be chilled to a temperature within the range of −95 to −105° F. to increase the amount of crystallized paraxylene therein before it is sent to centrifuging in basket-type centrifuge 25. In basket centrifuge 25 a cake may be separated having a paraxylene content of about 85% and a mother liquor separated having approximately 7.5% paraxylene content.

At times it may be desirable to subject the paraxylene cake in line 26 to a further crystallization process and in the drawing the further additional step is shown with a branch line 28 for passing the crystals to melt tank 29. The melted mixture is withdrawn from tank 29 through line 30 and passed to scraped surface chiller 31 where its temperature is reduced to below the crystallization temperature of paraxylene therein so as to form a slurry. The slurry passes from chiller 31 through line 32 to stock tank 33. From stock tank 33 the slurry passes through line 34 to a separating step shown as carried out in basket type centrifuge 35 from which a product of high paraxylene content is removed through outlet 36. The mother liquor from separating step 35 is removed through line 37. It is preferred to divide the mother liquor into several portions and to return one portion through line 38 to the feed in the first stage in line 12. Another portion is passed through line 39 and is used to improve the fluidity of the chilled slurry in the second stage. In the flow sheet the mother liquor from line 39 is passed into branch line 40 where it is added to the chilled slurry from scraped surface chiller 31 to improve its fluidity and another portion is passed through line 41 to line 34 to improve the fluidity of the slurry removed from the stock tank. Obviously, the amount of mother liquor added to improve the fluidity of the slurry is optional and the point of admixture is optional, for example, all of the mother liquor used to improve the fluidity of the slurry may be added to the chilled slurry discharged from chiller 31 by means of branch line 40.

By way of illustration a cake having a paraxylene content of about 85% which passes into melt tank 23 may be chilled in scraped surface chiller 31 to a temperature within the range of −10° to −20° F. and then passed to stock tank 33 which is kept at a temperature approximating that of the outlet temperature of chiller 31. The chilled slurry from the stock tank is passed to separating step 35 where it is separated into a mother liquor and a high paraxylene content product. The paraxylene content of the product removed through line 36 may be as high as 98% under satisfactory chilling and crystallization conditions.

While we have disclosed a preferred mode for carrying out our invention, it will be obvious to a workman skilled in the art that various changes may be made without departing from the scope of our invention.

What we desire to claim is:

1. A process for separating paraxylene from a feed stock consisting of a liquid mixture of hydrocarbons including paraxylene in the range of 12 to 25% by volume and at least one other isomeric xylene which comprises the steps of chilling feed stock to a temperature close to but above its crystallization temperature, admixing said chilled feed stock with a slurry of the same composition and at a lower temperature to form an admixture having a temperature approximately 10° F. below the crystallization temperature of said feed stock, passing said admixture through a scraped surface heat exchanger and there reducing its temperature approximately 10° F. further, passing the admixture from the scraped surface heat exchanger to a holding tank and there holding it at a temperature substantially the same as the outlet temperature of the scraped surface heat exchanger for an average time of about two hours in order to allow crystal growth, removing slurry from said holding tank and chilling it in a second scraped surface heat exchanger to a temperature at least 10° below the temperature in said holding tank and then subjecting it to a separating step to separate a high paraxylene content crystal fraction.

2. A process in accordance with claim 1 in which the high paraxylene content crystal fraction from the separating step is treated by melting it to form a melt, chilling said melt below the crystallization temperature of said melt to form a chilled slurry and said chilled slurry is sent to a second separating zone where crystals of increased paraxylene content are separated from mother liquor.

3. A process for separating paraxylene from a feed stock consisting of a liquid mixture of hydrocarbons including paraxylene in the range from about 12 to 25% by volume and at least one other isomeric xylene which comprises the steps of forming a first stream of said feed stock, chilling said first stream in a first chilling zone to a temperature close to but above the normal crystallization point thereof, admixing said first chilled stream with a second chilled stream of approximately the same composition to form a resultant mixture having a temperature about 10° F. below the crystallization temperature, passing said mixture through a first scraped surface heat exchanger to lower the temperature of said mixture approximately 10° F. further and holding the resultant chilled mixture at approximately the outlet temperature of said first scraped surface heat exchanger in a holding tank for at least two hours, withdrawing from said holding tank said previously mentioned second stream which is admixed with said first stream and withdrawing an additional portion of slurry from said holding tank and passing it through a second scraped surface heat exchanger to reduce its temperautre at least 10° F. below the temperature of said holding tank, passing chilled slurry from said second scraped surface heat exchanger to a separating zone and there separating a high paraxylene content crystal fraction.

4. A process in accordance with claim 3 in which the high paraxylene content crystal fraction from the separating step is treated by melting it to form a melt, chilling said melt below the crystallization temperature of said melt to form a chilled slurry and said chilled slurry is sent to a second separating zone where crystals of increased paraxylene content are separated from mother liquor.

5. A process for separating paraxylene from a feed stock consisting of a liquid mixture of hydrocarbons including paraxylene in the range from about 12 to 25% by volume and at least one other isomeric xylene which comprises the steps of forming a first stream from said feed stock, chilling said first stream to a temperature within the range of —35° to —55° F. and above the crystal point of said feed stock, admixing said first stream with a second stream of slurry of substantially the same composition of the feed stock to form an admixture having a temperature within the range of —65° to —75° F. and approximately 10° F. below the normal crystal temperature, passing said chilled mixture through a first scraped surface heat exchanger to reduce its temperature approximately 10° F. and in the range of —75° to —85° F. and passing said chilled mixture into a holding tank and holding the slurry for at least two hours within the temperature range to —75 to —85° F., withdrawing from said holding tank said second stream of slurry for admixture with said first stream and withdrawing from said holding tank an additional amount of slurry, chilling said additional amount of slurry in the second scraped heat exchanger to a temperature within the range of —95° to —105° F. and then sending it to a separating zone and separating therefrom crystals having a high paraxylene content from mother liquor.

6. A process in accordance with claim 5 in which the crystals of high paraxylene content are purified by melting them in a melting zone to form a melt, chilling said melt to a temperature within the range of —10 to —20° F. to form a chilled slurry and said chilled slurry sent to a second separating zone and there separated into a mother liquor fraction and a high paraxylene content fraction and the mother liquor fraction recycled to the chilled slurry to increase the fluidity thereof.

References Cited in the file of this patent

UNITED STATES PATENTS

| Number | Name | Date |
|---|---|---|
| 2,511,711 | Hetzner et al. | June 13, 1950 |
| 2,517,601 | Shafor et al. | Aug. 8, 1950 |
| 2,533,232 | Dressler | Dec. 12, 1950 |
| 2,561,665 | Booker | Sept. 8, 1953 |

OTHER REFERENCES

Riegel, Chemical Machinery, Reinhold Publishing Corp. (1944), p. 343.